Feb. 16, 1926.  1,573,635
L. A. DREY
METHOD OF FEEDING GLASS TO FORMING MACHINES
Original Filed Dec. 14, 1914   2 Sheets-Sheet 1

INVENTOR
LEO A. DREY
by Higdon & Longan   ATTYS.

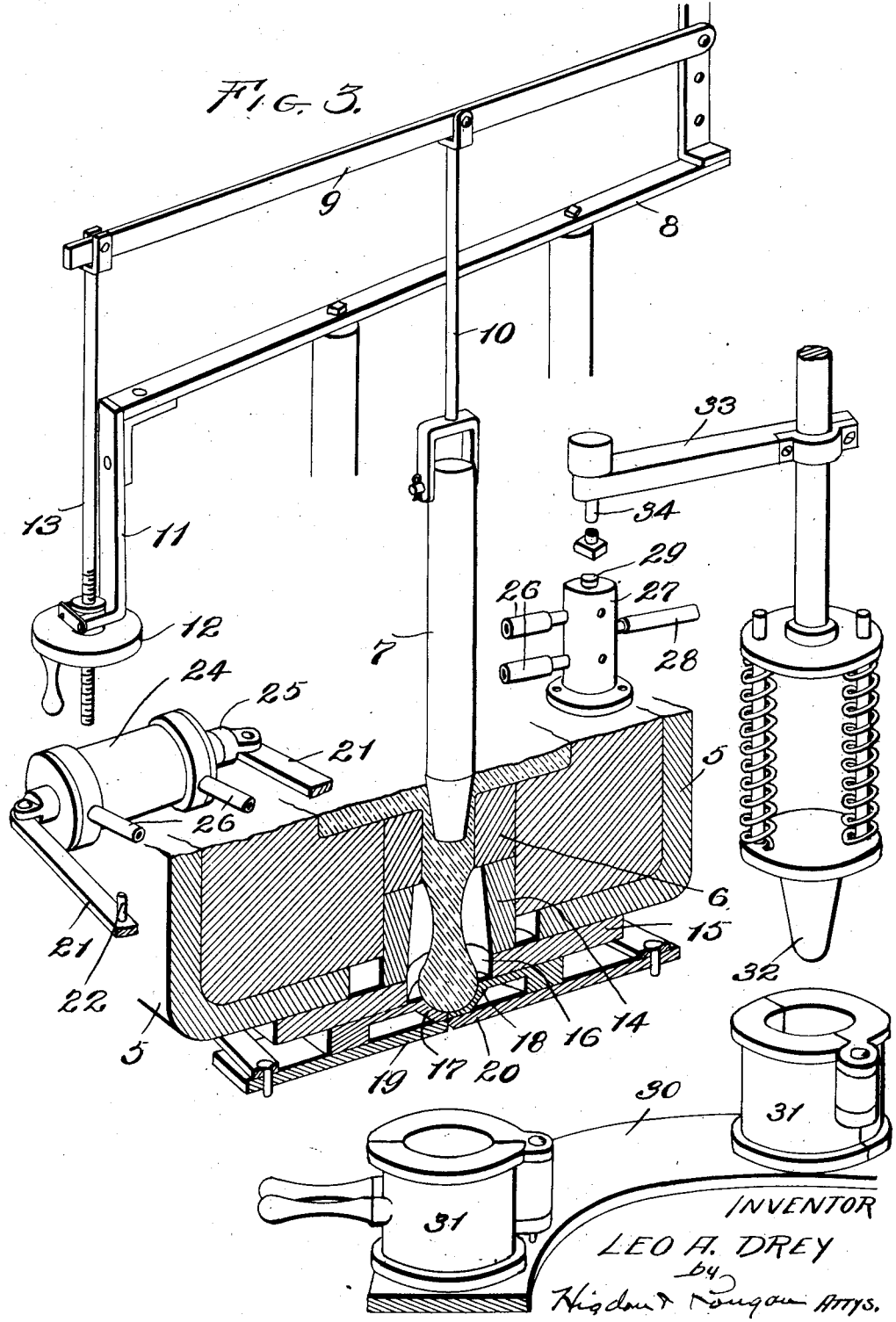

Patented Feb. 16, 1926.

1,573,635

UNITED STATES PATENT OFFICE.

LEO A. DREY, OF ST. LOUIS, MISSOURI, ASSIGNOR, BY MESNE ASSIGNMENTS, TO BALL BROTHERS COMPANY, OF MUNCIE, INDIANA, A CORPORATION OF INDIANA.

METHOD OF FEEDING GLASS TO FORMING MACHINES.

Original application filed December 14, 1914, Serial No. 877,070. Patent No. 1,146,694, dated July 13, 1915. Divided and this application filed June 28, 1915. Serial No. 36,724.

*To all whom it may concern:*

Be it known that I, LEO A. DREY, a citizen of the United States, and resident of St. Louis, Missouri, have invented certain new and useful Improvements in Methods of Feeding Glass to Forming Machines, of which the following is a specification containing a full, clear, and exact description, reference being had to the accompanying drawings, forming a part hereof.

My invention relates to improvements in methods of feeding glass to forming machines, wherein a controlled stream of glass is gathered in batches in a heated chamber on a support which is withdrawn upon an operation of a forming machine before the complete filling of the chamber, to the end that the batches are maintained in a heated chamber during their times of gathering and a minimum of their surfaces are contacted before being fed to the forming machine. This application is a division of my co-pending application Serial Number 877,070, filed December 14, 1914, and patented July 13, 1915, Number 1,146,694.

In this art various forms of apparatus have been devised, such as a discharging means controlled by a glass gathering and severing means, wherein the gathering means is filled at each operation, a discharging means controlled by a plug which cuts off the flow of glass during transfers of the molds of the forming machine, and a continuous free flowing discharging means whose stream is controlled by a cup and knife which dumps and cuts gatherings or batches from the stream and drops them into molds on the forming machine.

In the methods of the first and second types mentioned, the gathering devices are filled at each operation, which subjects the batch to contact on its bottom and sides and in the method of the third type the glass is gathered and dumped in the open, where it is exposed to chilling and its sides and bottom subjected to contact.

It is well known in this art that articles formed from batches gathered by a punty are relatively free from "markings" because such gatherings have been subjected to no contact between the furnace and the mold.

In the drawings, forming a part of this specification, I illustrate one form of apparatus capable of carrying out my method, and in which drawings—

Fig. 2 is a view similar to Fig. 1 showing the gathering and severing means in an open position and the batch being dropped therefrom and Fig. 3 is a diagrammatical perspective showing grouped fragments of a forming machine, the gathering and severing means, and automatic means for operating the gathering and severing means and the means for controlling the flow of glass.

Figure 1:
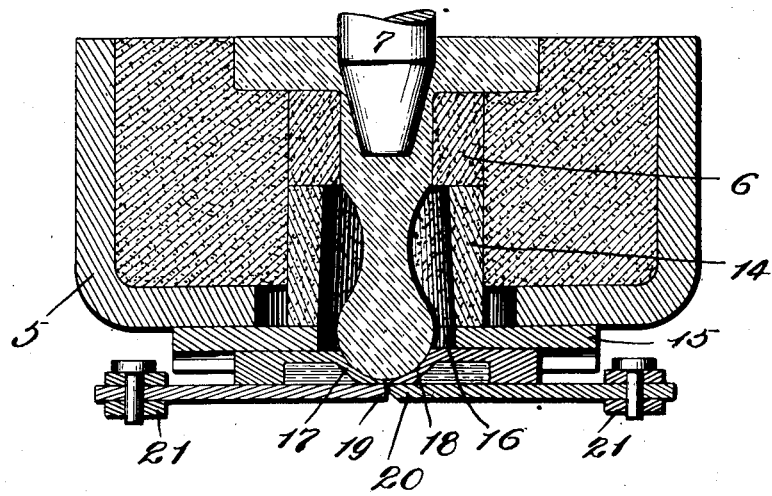
Fig. 1 is a fragmental sectional elevation showing the glass gathering and severing means in a closed position with a gathering or batch of glass therein.
Figure 2:
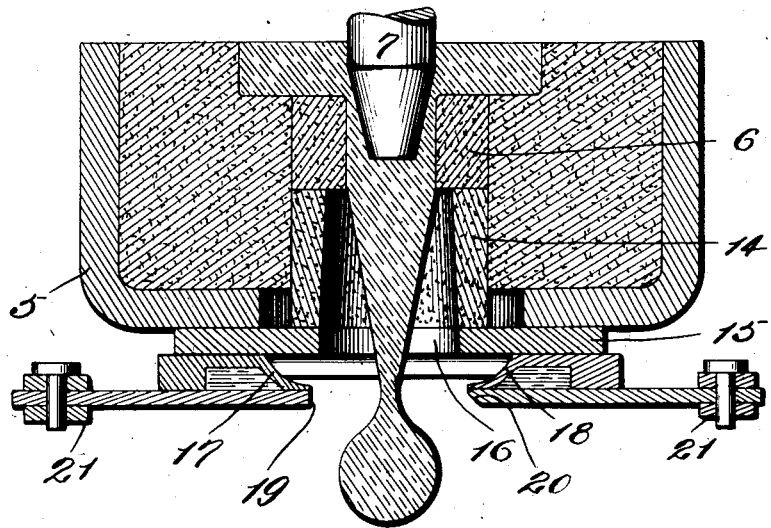

In order to make clear my method, I will describe in detail the construction and operation of the embodiment of my invention as illustrated, and will refer to the drawings by numerals, by which 5 will be employed to designate a boot or lateral projection of the furnace through which the glass flows to the discharge orifice. I prefer to employ as this orifice a ceramic bushing 6 through which the glass flows from the boot 5.

To control the flow or discharge of glass through the bushing 6 I employ a plug 7 of ceramic material and this plug is adjusted relative to the bushing by means comprising a frame 8 to which is pivotally attached a lever 9, from which is suspended the plug 7 by means of a link 10, a bracket 11 in which is mounted a hand wheel 12 and a threaded rod 13 connecting the lever 9 and the hand wheel.

In the boot beneath the bushing 6 (discharge orifice) I provide a tubular sleeve 14 whose internal diameter is greater than the diameter of the discharge orifice, to the end that a stream of glass flowing from the discharge orifice will flow through the sleeve 14 without contacting its sides. This sleeve is heated by conduction from the boot body, as well as from the stream of molten glass flowing therethrough and forms in effect a gaseous envelope or heated chamber through which the stream flows, with a minimum loss of temperature and free from contact.

Beneath the sleeve 14 I mount a head 15, having an opening 16 in registration with the sleeve and discharge orifice, and arranged to slidably support the glass gathering and severing means, which comprises the separable, water cooled cup-sections 17 and 18 and the knives or severing elements 19 and 20.

Pivotally connected with each knife is a lever 21 which are suspended from the boot and which fulcrum upon pins such as 22 shown in Fig. 3. At the ends of these levers opposite said knives is a cylinder 24 pivotally connected with the one lever while the stem 25 of the piston located within the cylinder is pivotally connected with the other lever. Leading from the ends of the cylinder are the flexible tubes 26 alternately serving as intake and exhaust pipes for the cylinder and controlled by a valve 27 in an air line 28 leading from a source of compressed air not shown. This valve includes a stem 29 which is movable to effect opening and closing of certain ports to the end that the air is first directed to one end of the cylinder and exhausted at the other end and then directed to the opposite end of the cylinder and exhausted.

The numeral 30 designates a fragment of the rotary table of a glass forming machine having intermittent motion to bring its molds 31 successively beneath the discharge orifice and beneath the plunger 32.

This machine belongs to the type in which the plunger is timed to operate with each movement of the table carrying the molds, for example the commercial "Miller" machine.

Secured to the plunger is an arm 33, whose free end carries a stem 34 operating through an opening formed in said arm to yieldingly bear upon the stem 29 of the air valve 27.

The operation of the apparatus just described is as follows:

Assuming the glass to be in a condition to freely flow through the discharge orifice, the plug adjusted to flow the right volume of glass as its fluidity demands, power applied to the forming machine, the air valve supplied with compressed air and the parts all in the position shown in Fig. 3, that is the gathering devices and knives in a closed position and the plunger of the forming machine elevated, it will be obvious that when the plunger descends the arm 33 carried thereby will actuate the valve 27 and supply air between one end of the cylinder 24 and the piston and exhaust the cylinder at its other end, so that the floating cylinder and its piston are both moved to rock the levers 21 and move the gathering devices from beneath the heated gathering chamber.

The gathered batch of glass is then free to drop into a mold. Immediately succeeding the dropping of the batch the plunger is elevated and the mold containing the batch is brought to position beneath the plunger.

This movement of the plunger just mentioned removes the stem 30 from the stem 29 of the air valve, to the end that the ports therein reverse the air and cause the cylinder and piston to bring the shear members to closed positions, whereat they conjointly act to sever the batch from the stream and are in position to gather a succeeding batch.

The adjustment of the plug referred to flows an amount of glass during the time of gathering less than the capacity of the heated gathering chamber, hence the batch is contacted only on its bottom, leaving the remainder of the batch in free suspension and enveloped in a gaseous envelope tending to prevent hetroplasticity in the batch.

In this manner the apparatus as a whole may be continuously operated, requiring only the adjustment of the plug to control the volume of glass as its fluidity varies and the removal of the finished articles from the molds.

Having thus described one form of apparatus capable of carrying out or performing my method, I will now describe the advantages and improved physical characteristics of the glass, from the furnace to the mold, and the finished article.

Glass, in its condition in the furnace, at the point of delivery, is the desideratum in the molds; at this point of the furnace, the glass is of uniform plasticity or density, by reason of its being in a quiescent molten condition. In my method this condition maintains at the discharge orifice and in the discharge practically the same condition exists, for the reason that the stream is directed without physical contact through a heated chamber or gaseous envelope at or about the same temperature as the furnace, and deposits or gathers upon a partible support, which engages only the bottom of the gathering or batch. This batch having only its bottom contacted, is then dropped by gravity directly into the mold, where its contacted bottom portion reaches the bottom of the mold and enters wholly into the bottom of the finished article, so that if the contact produces any "mark" on or in the article there will be little or no depreciation in the commercial value of the article, for the reason that the major visible portion of the article, such as the sides of a tumbler or fruit jar, will be clear.

It will thus be seen that the batch or gob out of which the desired article is to be formed is necessarily of slightly different plasticity or density where contacted with a support, during gathering, but not sufficiently to produce uncommercial imperfections in the finished article. That portion of the gathered batch or gob which contacts with the partible support naturally becomes a little denser by chilling or compression than the remainder of the gob, and if there are any imperfections in the finished article incident to the gathering, due to hetroplasticity or variation in density, these will appear in the bottom only of the article formed, as heretofore stated.

By controlling the stream with relation to the timing of the gathering and severing means, as well as the timing of the molds and plunger, I am enabled to obtain uniformity in volume or weight of the gatherings, to the end that the finished articles are of uniform weight, and further that the plunger and mold may have batches of uniform weight to act upon in the formation of articles having uniform thicknesses throughout.

I claim:

1. The method of delivering glass from a furnace to a mold, which consists in flowing glass on a support which contacts with only a portion of the batch and subjecting the free unsupported remaining portion of the batch to heat.

2. The gathering of a supported batch of glass without contacting the sides of the batch, to the end that the sides of the finished article are unmarked, and enveloping said uncontacted sides of the batch in heat during such gathering.

3. The method of delivering glass to a forming machine, which consists in discharging the glass from its receptacle by its own gravity into a chamber, accumulating within said chamber a gob of glass of substantially uniform density, and provided with a base to conform with the bottom of the mold of the forming machine, discharging said gob thus formed and severing the gob from the glass issuing from the chamber at a point where it has the least diameter.

4. The method of delivering as a continuous operation molten glass into a forming machine, which consists, in containing the molten glass in a suitable receptacle; in passing the discharged glass into a chamber between the receptacle and forming machine, and supporting it from beneath therein free from the sides of said chamber; and discharging and severing the glass accumulated within the chamber periodically with the movement of the molds carried by the forming machine.

5. The method of delivering glass which consists in continuously flowing glass, and in gathering supported batches, from the flow, whose side surfaces are in free suspension and unchilled during the time of gathering, and mechanically severing batches thus gathered from the flow.

6. The herein described method of delivering glass from a furnace to a mold which consists in gathering a batch, from a flow, on a support with the sides of the batch in free suspension and protected from atmospheric air, during the time of gathering, then withdrawing the support to permit the batch to drop into the mold, then severing the batch from the flow.

7. The method of delivering glass which consists in flowing glass from a furnace, in interrupting the flow to gather batches of column formation with their side surfaces unchilled and in free suspension during the time of gathering, and then severing the batches thus formed from the flow mechanically.

8. The method of delivering glass, to a forming machine, which consists in flowing glass through a discharge orifice, in enveloping the flowing glass, in heat, as it leaves the orifice and while it is in free suspension, in gathering batches in said heat, by supporting the free end of the stream, in periodically discharging and finally severing the discharged batches from the flow.

9. The method of delivering glass to a forming machine consisting of first causing a mass of glass to flow continuously; secondly, supporting said continuously flowing glass in a heated atmosphere whereby a gob of glass is formed which has had only a minor portion thereof contacted with during the formation of the gob, and third, periodically releasing and separating said gob from the stream and dropping it into the mold of a suitable forming machine.

10. The method of gathering glass from a continuously flowing stream which consists in interrupting said stream in an enclosed passage and causing it to form a gob therein, discharging said gob into the mold of a forming machine, and severing the stream above said gob, said gob having only a portion of its exterior surface contacting with a support and becoming chilled during its accumulating period.

11. The method of gathering gobs of glass from a constantly flowing stream which consists in first severing the stream and enlarging the severed end thereof, next supporting only a portion of said enlargement and gathering from said stream and above the enlargement additional glass without chilling the same, and lastly, withdrawing the support from said gob and dropping it into the mold of a forming machine and severing the stream above the gob.

12. The method of gathering gobs of glass from a constantly flowing stream which consists in supporting only the bottom of the gob while the remainder is being gathered and protected from contact with atmospheric air, and then severing the gathered gob from the on-coming stream.

13. The method of gathering gobs of glass from a constantly flowing stream which consists in first severing the stream, second, enlarging the severed end of said stream and supporting and chilling only the bottom of said enlargement, gathering from said stream and above the enlargement sufficient unchilled glass to form a gob, and lastly, dropping said gob and severing the stream above said gob.

14. The method of delivering glass from a furnace to a mold which consists in flowing the glass in a stream from a furnace, gathering and severing from said stream a batch which has only the bottom portion of its exterior surface chilled, whereby a batch is obtained whose side surface has a different density from its bottom surface.

15. The method of delivering glass from a furnace to a mold which consists in flowing the glass in a steam from the furnace, and separating from said stream at intervals a batch of glass which has had only a portion of its exterior surface chilled by being contacted with.

16. The method of gathering gobs of glass from a flowing stream which consists in interrupting said stream and retarding the interrupted portion of said stream by means of a separable support while the gob is being gathered, which support contacts with only a portion of the exterior surface of the gob during its gather, the remainder of the exterior surface being uncontacted with and of substantially furnace temperature.

17. The method of gathering gobs of glass by means of a separable support from a continuously flowing stream of glass, which consists in interrupting said stream, and then causing a portion of the interrupted stream to come in contact with said support so that its downward travel is interrupted and the glass permitted to accumulate to form a gob, said gob during its accumulation having only a portion of its exterior surface contacting with the support whereby a gob is formed which has only a portion of its exterior surface a different density than the remainder of said gob.

18. The method of delivering glass from a furnace to a mold from a continuously flowing stream, which consists in gathering and separating from said stream a batch of glass which has only a minor portion of its outside surface chilled by contacting with a support during its gathering period, the remainder thereof being protected against cold.

19. The method of delivering glass from a furnace to a mold from a continuously flowing stream, which consists in gathering in a cup from said stream a batch of glass, only the lower portion of the exterior surface of which contacts with said cup, the remainder being protected against contact with the outside air, releasing said batch from said cup and then severing the batch from the stream.

20. The method of gathering gobs of glass from a flowing stream which consists in first severing said stream, supporting the severed end so as to enlarge the same, and utilizing the enlarged end as a support for the on-coming stream to the end that a gob is gathered which has only a portion of its exterior surface chilled and contacted with.

21. The method of delivering glass to a forming machine consisting in first establishing a continuously flowing and regulated stream of glass, second, in gathering and forming from said stream in a closed passage of larger diameter than said stream and containing a heated atmosphere a gob of glass, which has only a minor portion contacted with, and, third, releasing and severing the gob thus formed from said stream thereby causing the same to drop into a mold periodically and independently of the weight of the gob.

22. The method of delivering glass from a furnace to a mold which consists in first establishing a continuously flowing and regulated stream of glass, forming from said stream at regular intervals, gobs of glass, supporting said gobs of glass in a closed chamber which during their formation and when completed have had only a portion of the exterior surface contact with whereby a gob is formed whose side surface has a different density from its bottom surface, separating the gobs thus formed and dropping the same at regular intervals into the mold of the forming machine.

23. The method of discharging and cutting off molten glass from a glass delivering receptacle having an upper outlet and a lower outlet connected by a closed passage, consisting in collecting a mass of glass in said passage between said outlets with the side surface thereof uncontacted and discharging said mass of glass, elongating the glass from the upper outlet in a portion narrower than the size of said lower outlet, and cutting off the glass at the lower outlet at such elongated portion.

24. The method of delivering molten glass from a furnace to a mold, which consists in flowing a stream of molten glass from a discharge outlet into a passage closed at its lower end and of larger diameter than said outlet, accumulating glass therein, surrounding the flowing stream and accumulated glass while in said passage with a highly heated atmosphere, periodically discharging the accumulated glass from said passage and severing the stream above the accumulated glass, and retaining the glass above the cutting point within the passage until the next accumulation of glass has been formed.

25. The method of delivering molten glass to a furnace, which consists in establishing a regulated flowing stream of glass, flowing said stream into a heated passage and supporting the same therein, accumulating glass in said passage in such a manner that it will be supported on its lower end only, releasing said accumulated glass and severing said stream above the accumulated glass and at its point of issuance from said passage thereby causing the accumulated severed mass to pass into a receptacle.

26. The method of delivering molten glass from a furnace which consists in establishing a flowing stream of glass, passing the same into a heated passage of larger diameter than said stream, and gathering a quantity of glass in said passage, which glass has only a portion of its exterior surface contacted with during such gather, then reopening said passage and permitting said gathered glass to pass from the passage, and then again closing said passage thereby severing the stream of glass and dropping said gather into a mold.

27. The method of delivering glass to a forming machine which consists in establishing a continuously flowing stream, regulating the volume of flow into a discharge orifice, enlarging the end by supporting and accumulating a gob which has only a minor portion of its surface contacted with, in a heated atmosphere, and periodically severing the stream and discharging said gob into the molds of a forming machine.

In testimony whereof, I have signed my name to this specification.

LEO A. DREY.